(12) United States Patent
Baldwin

(10) Patent No.: US 8,979,701 B2
(45) Date of Patent: Mar. 17, 2015

(54) MULTIPLE SPEED TRANSMISSION

(75) Inventor: Reid Alan Baldwin, Howell, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 603 days.

(21) Appl. No.: 12/210,231

(22) Filed: Sep. 15, 2008

(65) Prior Publication Data

US 2010/0069195 A1 Mar. 18, 2010

(51) Int. Cl.
*F16H 3/62* (2006.01)
*F16H 3/66* (2006.01)

(52) U.S. Cl.
CPC ............ *F16H 3/66* (2013.01); *F16H 2200/006* (2013.01); *F16H 2200/0065* (2013.01); *F16H 2200/2012* (2013.01); *F16H 2200/2046* (2013.01)
USPC .......................................................... 475/276

(58) Field of Classification Search
USPC .................. 475/269, 275, 278, 284, 277, 330
See application file for complete search history.

(56) References Cited

U.S. PATENT DOCUMENTS

| | | | |
|---|---|---|---|
| 6,176,803 B1 | 1/2001 | Meyer et al. | |
| 6,960,149 B2 | 11/2005 | Ziemer | |
| 7,524,259 B2 * | 4/2009 | Raghavan | 475/286 |
| 7,575,533 B2 * | 8/2009 | Gumpoltsberger | 475/280 |
| 7,686,731 B2 | 3/2010 | Raghavan | |
| 7,798,932 B2 * | 9/2010 | Wittkopp et al. | 475/269 |
| 8,157,695 B2 | 4/2012 | Phillips et al. | |
| 2007/0072732 A1 | 3/2007 | Klemen | |

FOREIGN PATENT DOCUMENTS

| | | |
|---|---|---|
| CN | 1826483 A | 8/2006 |
| CN | 101067440 A | 11/2007 |

OTHER PUBLICATIONS

Benford, H.L, et al. The Lever Analogy: A New Tool in Transmission Analysis, Society of Automotive Engineers, Inc., 1982.
Chinese Office Action dated Mar. 13, 2013 for Application No. 200910177710.4, filed Sep. 15, 2009, pp. 1-2.

* cited by examiner

*Primary Examiner* — Saul Rodriguez
*Assistant Examiner* — David J Hlavka
(74) *Attorney, Agent, or Firm* — James Dottavio; Brooks Kushman P.C.

(57) ABSTRACT

A multiple speed power transmission comprising: an input shaft, an output shaft, a first epicyclic gearing assembly with five rotating members, a second epicyclic gearing assembly with three rotating members, two clutches, and four brakes capable of producing nine forward speed ratios and one reverse speed ratio when clutches and brakes are applied in combinations of two.

8 Claims, 7 Drawing Sheets

| Element Number | Number of teeth |
|---|---|
| 22 | 29 |
| 24 | 85 |
| 28 | 28 |
| 32 | 39 |
| 34 | 73 |
| 38 | 17 |
| 42 | 39 |
| 44 | 73 |
| 48 | 17 |
| 52 | 37 |
| 54 | 73 |
| 58 | 18 |

Fig. 2

| Ratio # | Brake 60 | Brake 62 | Brake 64 | Brake 66 | Clutch 68 | Clutch 70 | Speed Ratio | Ratio Step |
|---|---|---|---|---|---|---|---|---|
| Rev |  | X |  | X |  |  | -5.000 |  |
| Low | X |  |  | X |  |  | 5.783 |  |
| 1st |  |  |  | X |  | X | 3.693 | 1.57 |
| 2nd | X |  |  |  |  | X | 2.759 | 1.34 |
| 3rd |  |  | X |  |  | X | 1.906 | 1.45 |
| 4th |  | X |  |  |  | X | 1.404 | 1.36 |
| 5th |  | X |  |  | X | X | 1.000 | 1.40 |
| 6th |  |  |  |  | X |  | 0.765 | 1.31 |
| 7th |  |  | X |  | X |  | 0.664 | 1.15 |
| 8th | X |  |  |  | X |  | 0.595 | 1.11 |

Fig. 3

| Element Number | Number of teeth |
|---|---|
| 82 | 29 |
| 84 | 73 |
| 88 | 22 |
| 92 | 37 |
| 94 | 85 |
| 98 | 24 |
| 102 | 29 |
| 104 | 73 |
| 108 | 22 |
| 112 | 37 |
| 114 | 73 |
| 118 | 18 |

Fig. 6

| Ratio # | Brake 60 | Brake 62 | Brake 64 | Brake 66 | Clutch 68 | Clutch 70 | Speed Ratio | Ratio Step |
|---|---|---|---|---|---|---|---|---|
| Rev |  | X |  | X |  |  | -4.557 |  |
| Low | X |  |  | X |  |  | 4.532 |  |
| 1st | X |  |  | X |  |  | 2.682 | 1.69 |
| 2nd |  |  | X |  |  | X | 2.078 | 1.29 |
| 3rd |  | X |  |  |  | X | 1.566 | 1.33 |
| 4th |  |  | X |  |  | X | 1.258 | 1.24 |
| 5th |  | X |  |  | X |  | 1.000 | 1.26 |
| 6th |  |  |  |  | X | X | 0.777 | 1.29 |
| 7th |  |  |  |  | X |  | 0.664 | 1.17 |
| 8th | X |  |  |  | X |  | 0.579 | 1.15 |

MULTIPLE SPEED TRANSMISSION

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

BRIEF DESCRIPTION OF THE DRAWINGS

FIG. 2 is a table showing proposed tooth numbers for the gears of the transmission illustrated in FIG. 1.

FIG. 3 is a table indicating the states of the clutches and the resulting speed ratios of the transmission in FIG. 1 when the gears have the number of teeth indicated in FIG. 2.

FIG. 6 is a table showing proposed tooth numbers for the gears of the transmission illustrated in FIG. 5.

FIG. 7 is a table indicating the states of the clutches and the resulting speed ratios of the transmission in FIG. 5 when the gears have the number of teeth indicated in FIG. 6.

DETAILED DESCRIPTION OF THE PREFERRED EMBODIMENT

Figure 1:
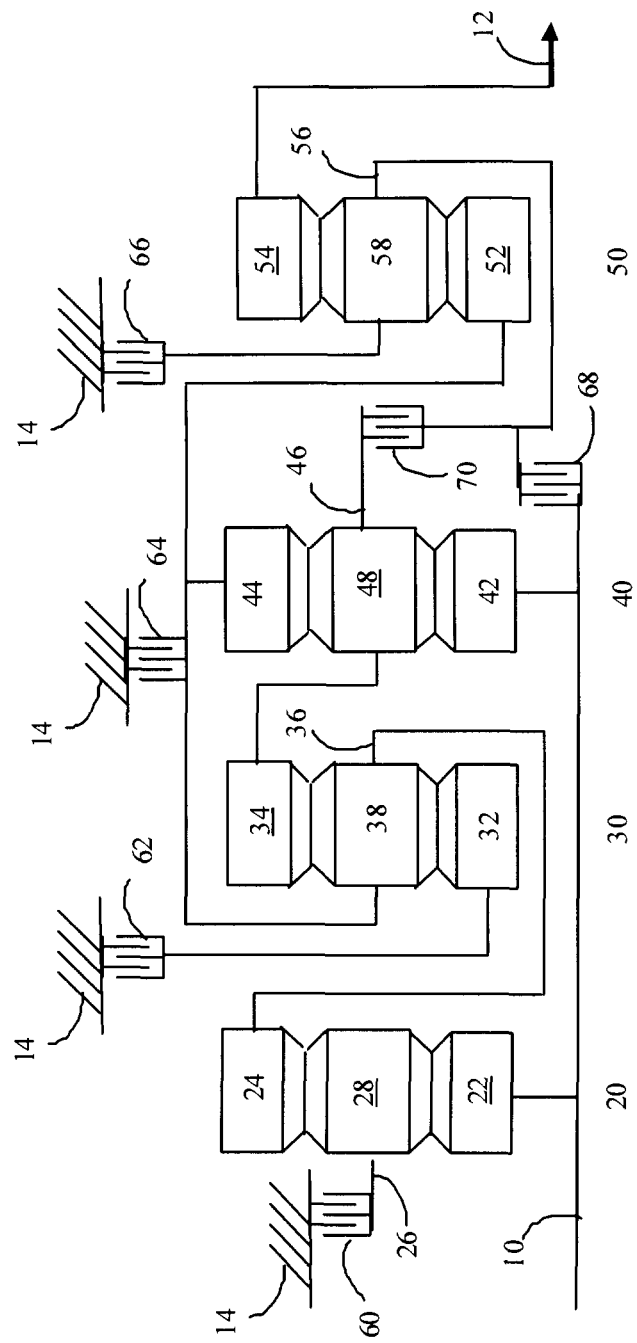
FIG. 1 is a schematic diagram of a transmission according to a first embodiment of the present invention which produces nine forward and one reverse speed ratios.

A transmission according to a first embodiment of the present invention is illustrated schematically in FIG. 1. Input shaft 10 is driven by the vehicle engine, preferably via a torque converter. Output shaft 12 drives the vehicle wheels, preferably via a differential.

Four simple planetary gear sets 20, 30, 40, and 50 each have a sun gear with external gear teeth, a ring gear with internal gear teeth, a planet carrier, and a set of planet gears that are supported for rotation with respect to the carrier and mesh with both the sun gear and the ring gear. Sun gears 22 and 42 are connected directly to the input shaft 10. Ring gear 54 is connected directly to the transmission output shaft. Ring gear 24, carrier 36, ring gear 44, and sun gear 52 are mutually connected such that they rotate in unison. Similarly, ring gear 34 and carrier 46 are mutually connected. Suggested tooth numbers for these gears are shown in FIG. 2.

Four brakes 60, 62, 64, and 66 selectively hold particular elements against rotation, providing a reaction torque. Preferably, these brakes are multi-plate friction clutches which hold the element to transmission case 14 when hydraulic pressure is applied to the clutch piston. Brake 60 selectively holds carrier 26 to transmission case 14. Brake 62 selectively holds sun gear 32 to transmission case 14. Brake 64 selectively holds ring gear 24, carrier 36, ring gear 44, and sun gear 52 to transmission case 14. Brake 66 selectively holds carrier 56 to transmission case 14. Two rotating clutches connect rotating element to one another such that they are forced to rotate as a unit. These are also preferably multi-plate friction clutches. Clutch 68 selectively connects the input shaft 10 to carrier 56. Clutch 70 selectively connects carrier 46 and ring gear 34 to carrier 56.

FIG. 3 indicates the states of the clutches for each of the nine forward ratios and the one reverse ratio.

To launch the vehicle from rest in 1st gear, hydraulic pressure is applied to engage brake 66 and clutch 70 while all other brakes and clutches are disengaged. To shift from 1st gear to 2nd gear, brake 66 is gradually disengaged while brake 60 is gradually engaged. To shift from 2nd gear to 3rd gear, brake 60 is gradually disengaged while brake 64 is gradually engaged. To shift from 3rd gear to 4th gear, brake 64 is gradually disengaged while brake 62 is gradually engaged. To shift from 4th gear to 5th gear, brake 62 is gradually disengaged while clutch 68 is gradually engaged. Clutch 70 remains engaged while operating in 1st through 5th gears. To shift from 5th gear to 6th gear, clutch 70 is gradually disengaged while brake 62 is gradually engaged. To shift from 6th gear to 7th gear, brake 62 is gradually disengaged while brake 64 is gradually engaged. Finally, to shift from 7th gear to 8th gear, brake 64 is gradually disengaged while brake 60 is gradually engaged. Clutch 68 remains engaged while operating in 5th through 8th gears.

A special low ratio is also available which may be used for special purposes such as off road usage or may be used to enable elimination of a torque converter. This ratio is selected by applying brake 60 and brake 66 while disengaging all other brakes and clutches. If the transmission does not include a torque converter or other dedicated launch device, the transmission is prepared for forward launch in low by engaging only brake 60. Then, brake 66 is gradually applied based on the torque demanded by the driver. To shift from low to 1st gear, brake 60 is gradually disengaged while clutch 70 is gradually engaged, maintaining brake 66 in the engaged state.

Reverse ratio is selected by applying brake 62 and brake 66 while disengaging all other brakes and clutches. If the transmission does not include a torque converter or other dedicated launch device, the transmission is prepared for reverse launch by engaging only brake 62. Then, brake 66 is gradually applied based on driver demand.

Figure 4:
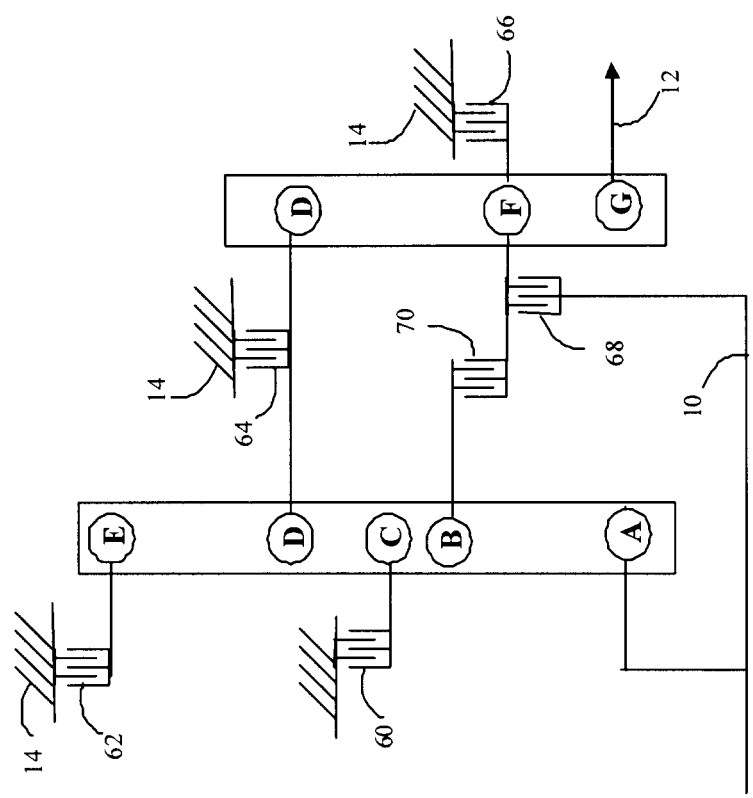
FIG. 4 is a lever diagram illustrating the speed relationships of a transmission according to the present invention.

FIG. 4 is a lever diagram illustrating the speed relationships among elements of a transmission according to the present invention. Gear sets 20, 30, and 40 of FIG. 1 collectively form an epicyclic gearing assembly with five rotating bodies that each rotate about the central axis. The speeds of these five bodies are linearly related such that the speeds of any two bodies determine the speeds of the remaining three bodies. These three gear sets correspond to the left lever in FIG. 4. Body A corresponds to sun gear 22 and sun gear 42. Body B corresponds to ring gear 34 and carrier 46. Body C corresponds to carrier 26. Body D corresponds to ring gear 24, carrier 36, and ring gear 44. Body E corresponds to sun gear 32. Gear set 50 is an epicyclic gearing assembly with three elements and corresponds to the right lever in FIG. 4. Body D corresponds to sun gear 52 which is connected to the elements making up body D within the left lever. Body F corresponds to carrier 56. Body G corresponds to ring gear 54. The speeds of these three bodies are linearly related such that the speeds of any two of them determine the speed of the remaining body.

When the gear sets of FIG. 1 have the tooth numbers indicated in FIG. 2, the speed of body B is equal to 0.6518 times the speed of body D plus (1−0.6518) times the speed of body A. These weighting factors impact the overall speed ratio in 1st through 5th gears. Similarly, the speed of body C is equal to 0.7456 times the speed of body D plus (1−0.7456) times the speed of body A. These weighting factors impact the ratio in low and 8th. The speed of body D is equal to 0.6054 times the speed of body E plus (1−0.6054) times the speed of body A. These weighting factors impact the reverse speed ratio. Finally, the speed of body F is equal to 0.3364 times the speed of body D plus (1−0.3364) times the speed of body G.

These last weighting factors influence all of the ratios except direct drive. Many other configurations of planetary gear sets are available which produce weighting factors very close to this, including configurations that include double pinion planetary gear sets and gear sets that share planet gears. Any of these alternate configurations may be substituted and the same overall speed ratios will result.

Figure 5:
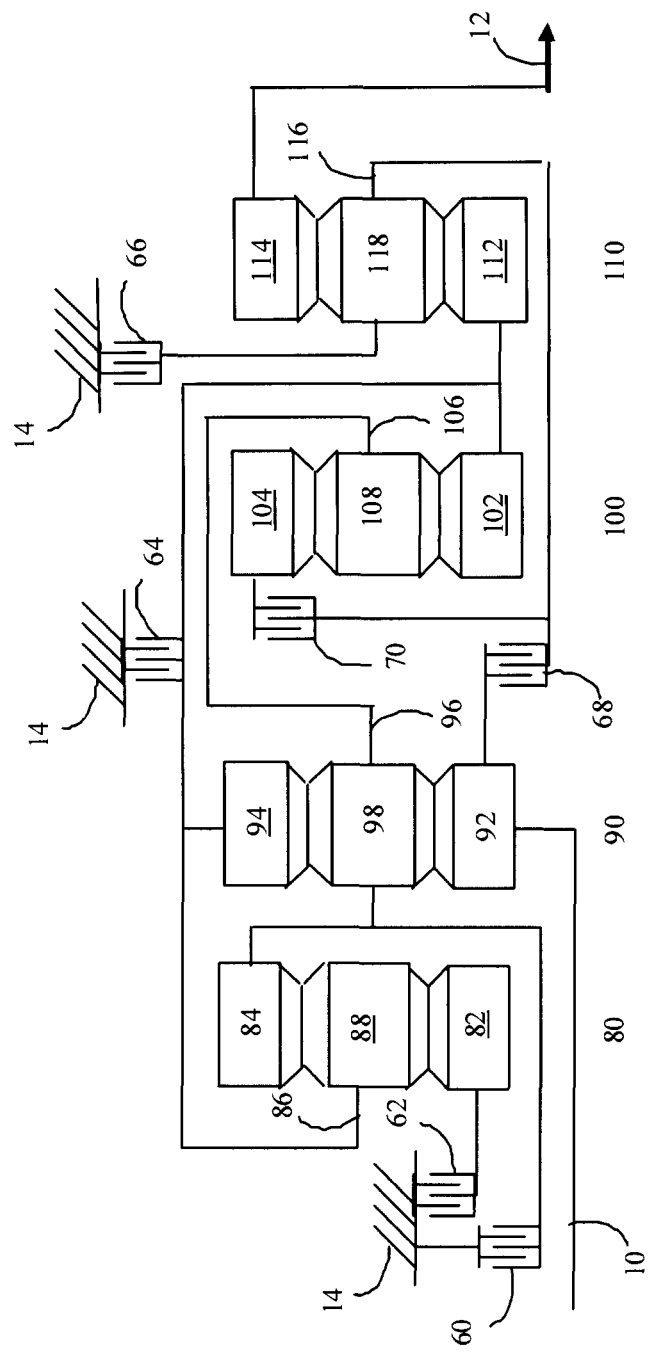
FIG. 5 is a schematic diagram of a transmission according to a second embodiment of the present invention which produces nine forward and one reverse speed ratios.

A transmission according to a second embodiment of the present invention is illustrated schematically in FIG. 5. This embodiment also corresponds to the stick diagram of FIG. 4, but uses a different configuration of planetary gear sets corresponding to the left lever. Input shaft 10 is driven by the vehicle engine, preferably via a torque converter. Output shaft 12 drives the vehicle wheels, preferably via a differential.

Four simple planetary gear sets 80, 90, 100, and 110 each have a sun gear with external gear teeth, a ring gear with internal gear teeth, a planet carrier, and a set of planet gears that are supported for rotation with respect to the carrier and mesh with both the sun gear and the ring gear. Sun gear 92 is connected directly to the input shaft 10. Ring gear 114 is connected directly to the transmission output shaft. Ring gear 84, carrier 96, and carrier 96 are mutually connected. Similarly, carrier 86, ring gear 94, sun gear 102, and sun gear 112 are mutually connected. Suggested tooth numbers for these gears are shown in FIG. 6.

Four brakes 60, 62, 64, and 66 selectively hold particular elements against rotation, providing a reaction torque. Brake 60 selectively holds ring gear 84, carrier 96, and carrier 106 to transmission case 14. Brake 62 selectively holds sun gear 82 to transmission case 14. Brake 64 selectively holds carrier 86, ring gear 94, sun gear 102, and sun gear 112 to transmission case 14. Brake 66 selectively holds carrier 116 to transmission case 14. Two rotating clutches connect rotating element to one another such that they are forced to rotate as a unit. Clutch 68 selectively connects the input shaft 10 to carrier 116. Clutch 70 selectively connects ring gear 104 34 to carrier 116.

FIG. 7 indicates the states of the clutches for each of the nine forward ratios and the one reverse ratio. The operation of this embodiment is identical to the operation of the embodiment of FIGS. 1-3 as described above.

The first three gear sets of FIG. 5 contain five rotating bodies that each rotate about the central axis. The speeds of these five bodies are linearly related such that the speeds of any two bodies determine the speeds of the remaining three bodies. These three gear sets correspond to the left lever in FIG. 4. Body A corresponds to sun gear 92. Body B corresponds to ring gear 104. Body C corresponds to ring gear 84, carrier 96, and carrier 106. Body D corresponds carrier 86, ring gear 94, and sun gear 102. Body E corresponds to sun gear 82. Gear set 110 corresponds to the right lever in FIG. 4. Body D corresponds to sun gear 112 which is connected to the elements making up body D within the left lever. Body F corresponds to carrier 116. Body G corresponds to ring gear 114. The speeds of these three bodies are linearly related such that the speeds of any two of them determine the speed of the remaining body.

When the gear sets of FIG. 1 have the tooth numbers indicated in FIG. 2, the speed of body B is equal to 0.5762 times the speed of body D plus (1−0.5762) times the speed of body A. Similarly, the speed of body C is equal to 0.6967 times the speed of body D plus (1−0.6967) times the speed of body A. The speed of body D is equal to 0.5671 times the speed of body E plus (1−0.5671) times the speed of body A. Finally, the speed of body F is equal to 0.3364 times the speed of body D plus (1−0.3364) times the speed of body G. Any alternate configuration of gearing that produce approximately these same relationships may be substituted without departing from the spirit of this invention.

In accordance with the provisions of the patent statutes, the preferred embodiment has been described. However, it should be noted that alternate embodiments can be practiced otherwise than as specifically illustrated and described.

What is claimed is:

1. A multiple speed power transmission comprising:
    an input;
    an output;
    a first planetary gear set including a first sun directly connected to the input, a first ring gear, a first planet carrier, and a first set of planet gears supported by the first planet carrier and meshing with both the first sun gear and the first ring gear;
    a second planetary gear set including a second sun gear, a second ring gear, a second planet carrier directly connected to the first ring gear, and a second set of planet gears supported by the second planet carrier and meshing with both the second sun gear and the second ring gear;
    a third planetary gear set including a first rotating body directly connected to the second ring gear, a second rotating body, and a third rotating body, wherein the first rotating body, second rotating body, and third rotating body rotate about a central axis at linearly related speeds;
    a fourth planetary gear set including a fourth rotating body directly connected to the output, a fifth rotating body, and a sixth rotating body, wherein the fourth rotating body, fifth rotating body, and sixth rotating body rotate about the central axis at linearly related speeds;
    a first clutch configured to releasably hold the first planet carrier against rotation;
    a second clutch configured to releasably hold the second sun gear against rotation; and
    a third clutch configured to releasably hold the fifth rotating body against rotation.

2. The multiple speed power transmission of claim 1 wherein the first rotating body is a third planet carrier, the second rotating body is a third sun gear, and the third rotating body is a third ring gear.

3. The multiple speed power transmission of claim 1 wherein the fourth rotating body is a fourth ring gear, the fifth rotating body is a fourth planet carrier, and the sixth rotating body is a fourth sun gear.

4. The multiple speed power transmission of claim 1 further comprising a fourth clutch, a fifth clutch, and a sixth clutch, wherein engagement of various combinations the first through sixth clutches establish ten distinct speed ratios between the input and the output, including one reverse ratio, five ratios in which the input rotates faster than the output, a direct drive ratio, and three ratios in which the input rotates slower than the output.

5. The multiple speed power transmission of claim 4 wherein the fourth clutch is configured to releasably hold the second planet carrier against rotation.

6. The multiple speed power transmission of claim 4 wherein the fifth clutch is configured to releasably connect the fifth rotating body to the input.

7. The multiple speed power transmission of claim 4 wherein the sixth clutch is configured to releasably connect the fifth rotating body to the first rotating body.

8. The multiple speed power transmission of claim 4 wherein the second rotating body is directly connected to the input.

\* \* \* \* \*